Figure 1:
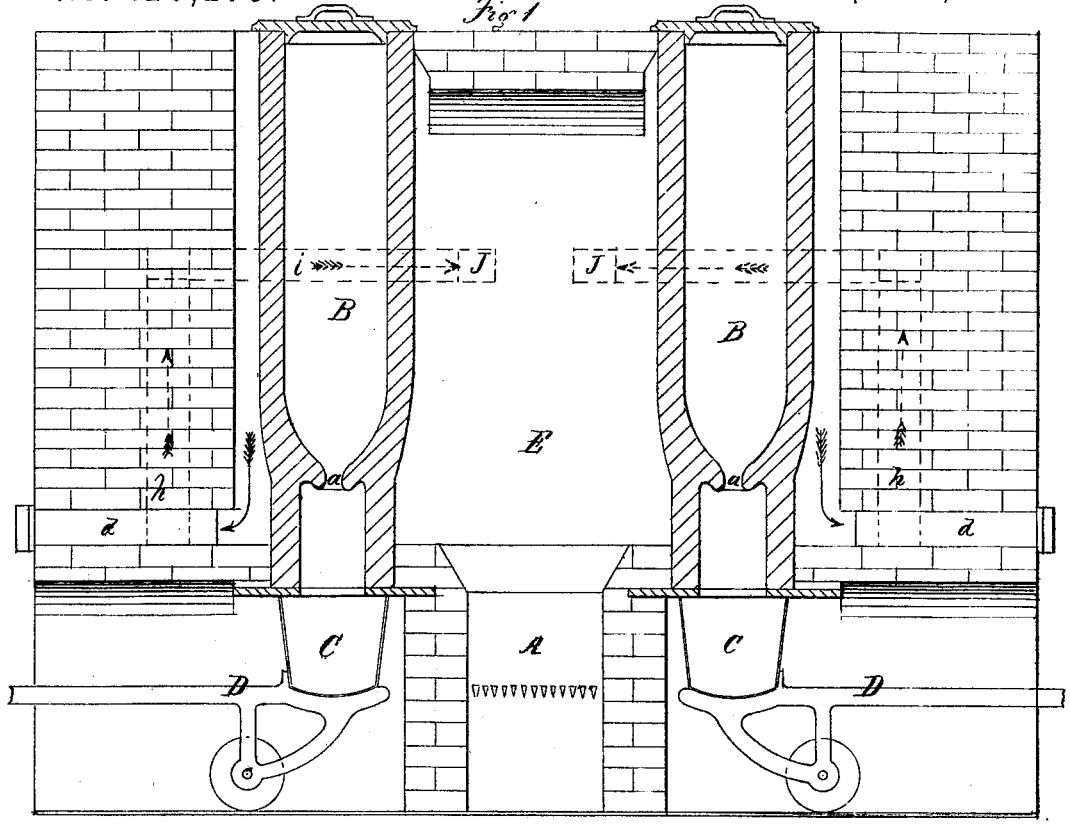

A. K. EATON.
Improvement in the Manufacture of Sulphide of Sodium.
No. 126,275. Patented April 30, 1872.

UNITED STATES PATENT OFFICE.

ASAHEL K. EATON, OF BROOKLYN, N. Y., ASSIGNOR TO HIMSELF, ALBAN MANN, AND WM. MANN, OF SAME PLACE.

IMPROVEMENT IN THE MANUFACTURE OF SULPHIDE OF SODIUM.

Specification forming part of Letters Patent No. 126,275, dated April 30, 1872.

*To all whom it may concern:*

Be it known that I, ASAHEL K. EATON, of Brooklyn, in the county of Kings and State of New York, have invented a new and Improved Method of Manufacturing Sulphide of Sodium; and I do hereby declare the following to be a full, clear, and exact description of the same, reference being had to the accompanying drawing making part of this specification, in which a furnace and apparatus is illustrated, showing a practical application of my said invention.

My invention consists in the manufacture of the sulphide of sodium from crude sulphate of soda by melting the latter in a heated tube, vessel, or receptacle, and causing it, while in a melted state, to percolate through highly-heated carbon, whereby it is decomposed and sulphide of sodium produced.

To enable others skilled in the art to which my invention most nearly appertains to practice the same, I will proceed to describe the furnace and apparatus illustrated by the drawing.

Similar letters of reference represent corresponding parts of the different figures—

Figure 2:
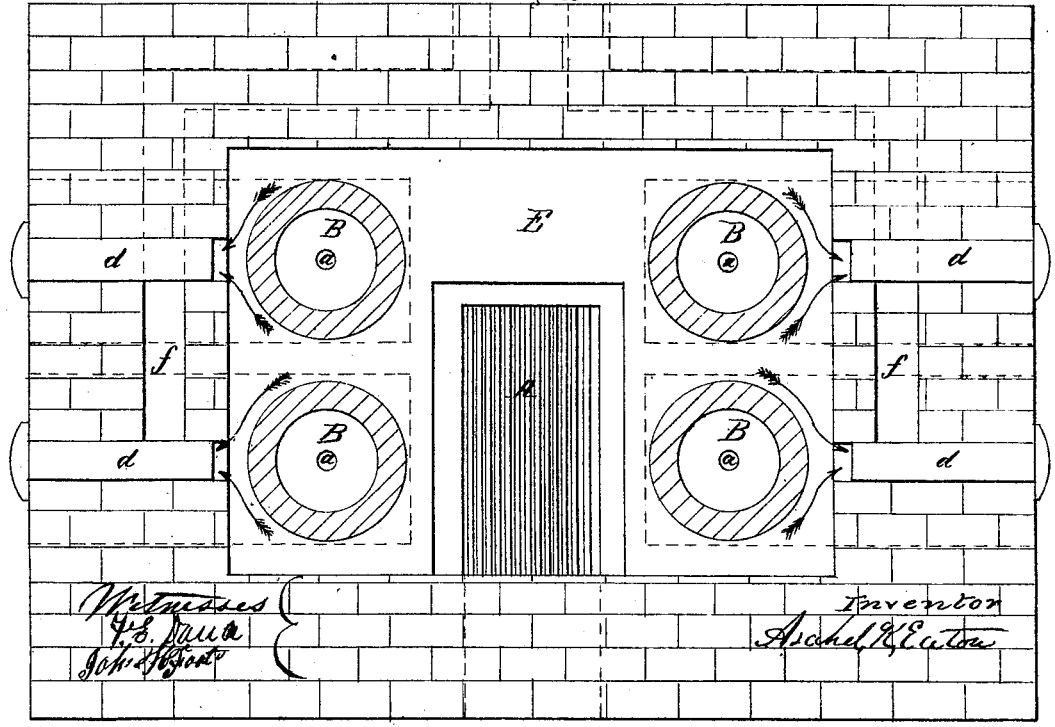

Figure 1 being a vertical section through one set of tubes and furnace, and Fig. 2 being a horizontal section through the tubes and over the furnace.

The tubes in which the charcoal, coke, or other form of carbon is to be heated and the sulphate of soda melted is represented in the drawing by B. They are composed of fire-clay or other refractory material, and are set in a brick chamber inclosed on all sides around a furnace, A. The lower part or end of the tubes is contracted, as shown by $a$, so as to retain the carbon and sulphate until the latter is melted, when it percolates down through the carbon and runs out of the orifice $a$ into the receiver C fixed upon a truck, as shown by D, to receive it. The chamber in which the tubes are placed is, as has been stated, closed on all sides, thus confining the entire heat of the furnace, or nearly the entire heat, upon all sides of the tubes, there being no more circulation of heat through the chamber than what is just necessary to support sufficient combustion in the furnace and to make the heat uniform in each part of the chamber; the flues leading from it into the chimney open into the chamber at the bottom thereof, as shown by $a\ a'$; these flues lead from said chamber up through the brick-work, as shown by $h\ i\ j$; and the amount of draught is regulated by the dampers $d\ d'\ d\ d'$.

Now, in operating this apparatus, the tubes are first raised to a bright-red heat; the coke, charcoal, or other suitable form of carbon is then introduced, to a depth about sufficient to occupy about three-fourths of the capacity of the tubes, when the coal becomes raised to a heat uniform with that of the tubes, which must not be below a bright red. The crude sulphate of soda is thrown in upon the ignited carbon until the upper portion of the tube is full. The sulphate immediately melts and percolates through the charcoal and becomes rapidly converted into sulphide, which discharges itself through the orifice in the lower part of the retort, as above described. The tubes or receptacles are afterward charged, at regular intervals, with fresh portions of carbon and sulphate of soda, rendering the process continuous. The carbon and sulphate of soda may be charged separately or commingled as the carbon is carried to the lower portion of the tubes or receptacles, and serves to keep up the supply there, it being only consumed in converting the sulphate to sulphide, which takes place principally in the lower portion of the tubes or receptacles. Chips, sawdust, or wood, or other source of carbon may be used, as they are converted into carbon in the process. Care should be taken to keep up a sufficient supply of carbon, so that there will always be enough in the lower portion of the tubes or receptacles to insure the perfect conversion of the sulphate of soda into the sulphide of sodium as the melted sulphate percolates through it, and care should also be taken to exclude the air from the tubes. The proportion of materials should be about five portions of sulphate of soda to one of carbon.

In this way I secure the perfect conversion of the sulphate of soda to sulphide of sodium with the least possible amount of carbon, and obtain the product in its solid and most compact form. The tubes or retorts should be of sufficient length to insure perfect conversion— say about four and a half feet—and they may be arranged differently from that shown in the drawing, and there may be more or less of them, as the case may require. But, whatever arrangement of tubes and furnace may be made, there must be the necessary heat, and it must be uniformly applied to the tubes to insure good results.

The sulphide of sodium produced by this process, if carefully done, contains only about three or four per cent. of foreign matter.

I claim as my invention and desire to secure by Letters Patent—

Manufacturing sulphide of sodium from crude sulphate of soda by melting the latter in a heated tube, vessel, or receptacle, and causing it, while in a melted state, to percolate through highly-heated carbon, whereby it is decomposed and sulphide of sodium produced, which may be drawn off as fast as the percolation takes place, or be tapped off after accumulation.

ASAHEL K. EATON.

Witnesses:
F. E. DANA,
JOHN H. FOOTE.